(12) United States Patent
Hayes

(10) Patent No.: US 6,464,167 B2
(45) Date of Patent: Oct. 15, 2002

(54) VEHICLE WITH VERTICAL WINGS AND A STABILIZING TORQUE SYSTEM OF JETS TO USE FLUID ENERGY FOR FORWARD MOTION

(76) Inventor: James C. Hayes, 8150 Odile, Brossard, Québec (CA), J4Y 2W8

( * ) Notice: Subject to any disclaimer, the term of this patent is extended or adjusted under 35 U.S.C. 154(b) by 0 days.

(21) Appl. No.: 09/800,659

(22) Filed: Mar. 8, 2001

(65) Prior Publication Data

US 2001/0020665 A1 Sep. 13, 2001

(30) Foreign Application Priority Data

Mar. 10, 2000 (CA) .............................................. 2300714

(51) Int. Cl.[7] .............................................. B64C 15/00
(52) U.S. Cl. .............................. 244/15; 244/91; 244/52; 244/78; 244/204; 244/130; 244/214
(58) Field of Search .............................. 244/91, 15, 16, 244/78, 52, 204, 130, 214, 208, 209, 210; 114/39.23, 39.3, 102.13

(56) References Cited

U.S. PATENT DOCUMENTS

| | | | | | |
|---|---|---|---|---|---|
| 1,913,644 | A | * | 6/1933 | Stalker | ..................... 244/208 |
| 2,049,573 | A | * | 8/1936 | Stalker | ..................... 244/208 |
| 3,774,867 | A | * | 11/1973 | Quinn | ..................... 244/204 |
| 4,982,679 | A | * | 1/1991 | Walker | ................. 114/102.13 |
| 5,090,766 | A | * | 2/1992 | Ito et al. | |
| 5,100,081 | A | * | 3/1992 | Thomas | ..................... 244/204 |
| 5,320,310 | A | * | 6/1994 | Mitchell | ............... 144/102.13 |
| 5,582,364 | A | * | 12/1996 | Trulin et al. | |
| 5,868,092 | A | * | 2/1999 | Milidragovic | ......... 114/102.13 |
| 6,186,443 | B1 | * | 2/2001 | Shaffer | |
| 6,234,751 | B1 | * | 5/2001 | Hassan et al. | ............. 244/130 |
| 6,267,331 | B1 | * | 7/2001 | Wygnanski et al. | ........ 244/204 |

FOREIGN PATENT DOCUMENTS

FR 2744094 8/1997

* cited by examiner

Primary Examiner—Charles T. Jordan
Assistant Examiner—Lulit Semunegus
(74) Attorney, Agent, or Firm—Robic

(57) ABSTRACT

Disclosed is a fluid vehicle having one or more vertical wings in contact with the fluid for generating a forward motion. This fluid vehicle also has a stabilizing torque system for generating jets transverse to the forward motion for the purpose of counterbalancing any capsizing effect. Preferably, the system is devised to generate up and down jets to the opposite ends of at least one horizontal wing.

4 Claims, 3 Drawing Sheets

VEHICLE WITH VERTICAL WINGS AND A STABILIZING TORQUE SYSTEM OF JETS TO USE FLUID ENERGY FOR FORWARD MOTION

BACKGROUND OF THE INVENTION a) Field of the Invention

The present invention relates to a fluid vehicle that makes use of one or more vertical wings for forward motion and incorporates a stabilizing torque system of jets in order to counterbalance any capsizing effect.

b) Brief Description of the Prior Art

It is of common practice to use vertical wings for forward motion in sailing boats.

It has also been suggested to use vertical wings for forward motion in other vehicles moving in a fluid, like air or water. By way of non-restrictive example, reference can be made to French laid-open patent application No. 2,744, 094 to J. L. COUTURIER, which discloses a glider on top of which is mounted a wind sail operable by the pilot.

The problem with fluid vehicles that use vertical wings or sails for forward motion, is that the fluid that blows onto the wings or sails, does not exclusively generates a forward motion. Indeed, it may also generate a capsizing effect. In the particular case of sailing boats, this effect is usually counterbalanced by a dagger board or a center board. However, in other fluid vehicles such as gliders, aircrafts or submarines, such a counterbalancing is not easy to achieve.

SUMMARY OF THE INVENTION

The object of the present invention is to provide an improved fluid vehicle that comprises one or more vertical wings in contact with the fluid for generating a forward motion. This fluid vehicle is improved in that it incorporates a stabilizing torque system for generating jets transverse to the forward motion for the purpose of counterbalancing any capsizing effect.

The vehicle according to the invention is devised for sailing in any kind of fluid, such as air or water. Preferably, it comprises at least one horizontal wing, and its stabilizing torque system is devised to generate jets up and down to opposite ends of the horizontal wing(s).

In accordance with the invention, the stabilizing torque system may comprise an engine-driven pump for compressing the fluid and generating the requested jets.

However, in accordance with a particularly preferred embodiment of the invention, fluid pressure is generated by a windmill comprising revolving foils fixed to a rotatable shaft that is mounted in each of the horizontal wings forming parts of the vehicle. Propellers are fixed at the ends of the shaft to provide the requested fluid pressure for generating the up and down jets. Such jets are used for provide the requested stability, especially in the case of air flying vehicles. The fluid pressure may also be used to cool engine(s) and/or provide rear propulsion jet.

The fluid under pressure overflows from the propellers fixed to the ends of the shaft of the windmill(s) that are driven by their revolving foils that generate a Bernoulli effect for lift and forward pressure. The fluid enters the wings through slots provided at their front edges. As a bonus, the windmills located in the wings provide lift by Magnus effect.

Of course, a tilt activated control valve known per se must be used to measure clockwise and counterclockwise motion of the wing(s) and to stabilize this motion by supplying the fluid under pressure to nozzle(s) devised to produce said up and down jets for producing the requested countertorque. In other words, the valve is used for controlling the vertical up and down jets to provide the requested countertorque.

The fluid vehicle according to the invention may have an internal engine, a set of internal shrouded propellers or jets, or both. It may be in the form of a sailing aircraft, submarine, plane or car.

A detailed description of a preferred embodiment of the invention will now be made with reference to the accompanying drawings. Even though this preferred embodiment is an aircraft, the invention is not restricted to this type of vehicle exclusively. As a matter of fact, the invention actually encompasses other types of vehicles, such as, for examples, submarines for sailing in water using water currents for forward motion; sailing planes using wind connected to under water sailing vehicle which uses water currents; flying cars; etc. . . All of these vehicles may be regular, canard, magnet, gyro, amphibious or a combination of them.

DETAILED DESCRIPTION OF A PREFERRED EMBODIMENT OF THE INVENTION

Figure 1:
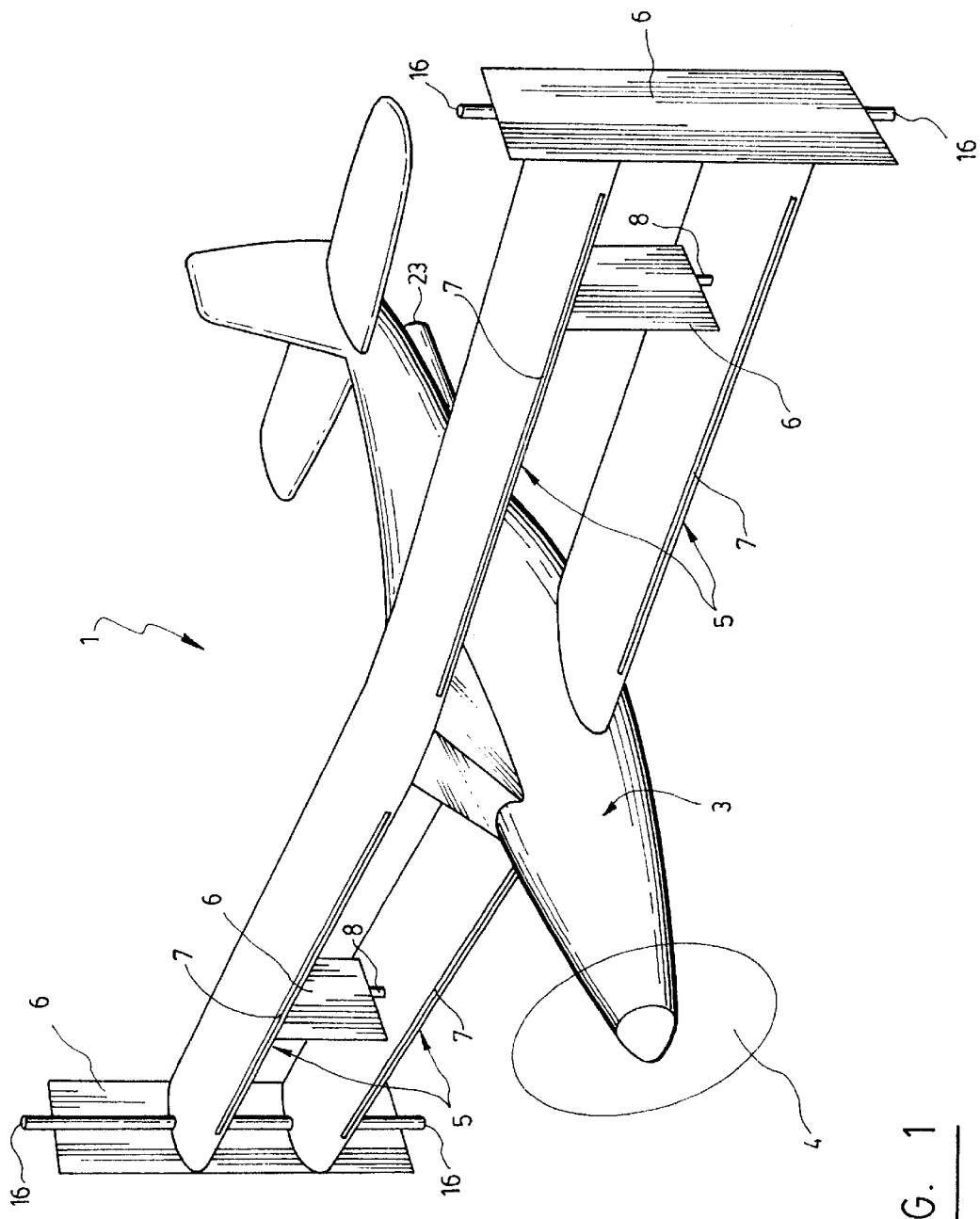
FIG. 1 is a perspective view of a stabilized vertical wing sailing aircraft according to a preferred embodiment of the invention.

The aircraft 1 according to the preferred embodiment of the invention as shown in the accompanying figures comprises:

a fuselage 3, an engine-driven propeller 4 for use to facilitate take off the aircraft and to compensate any lack of wind-generated powder, a pair of superimposed horizontal wings 5 extruding on both sides of the fuselage; and a plurality of vertical wings 6 extending in between the horizontal wings.

In use, the vertical wings 6 act as wind sails and convert the surrounding wind energy into forward motion. Advantageously, the wings 6 may be mounted on vertical shafts 8 so as to be easily adjustable by suitable means (not shown) as a function of the direction of the wind, like the sail of a boat. The problem of course when use is made of such wind sails, is to compensate the torque effect of the wind. This problem is the one that is solved by the present invention as will be explained hereinafter.

Figure 2:
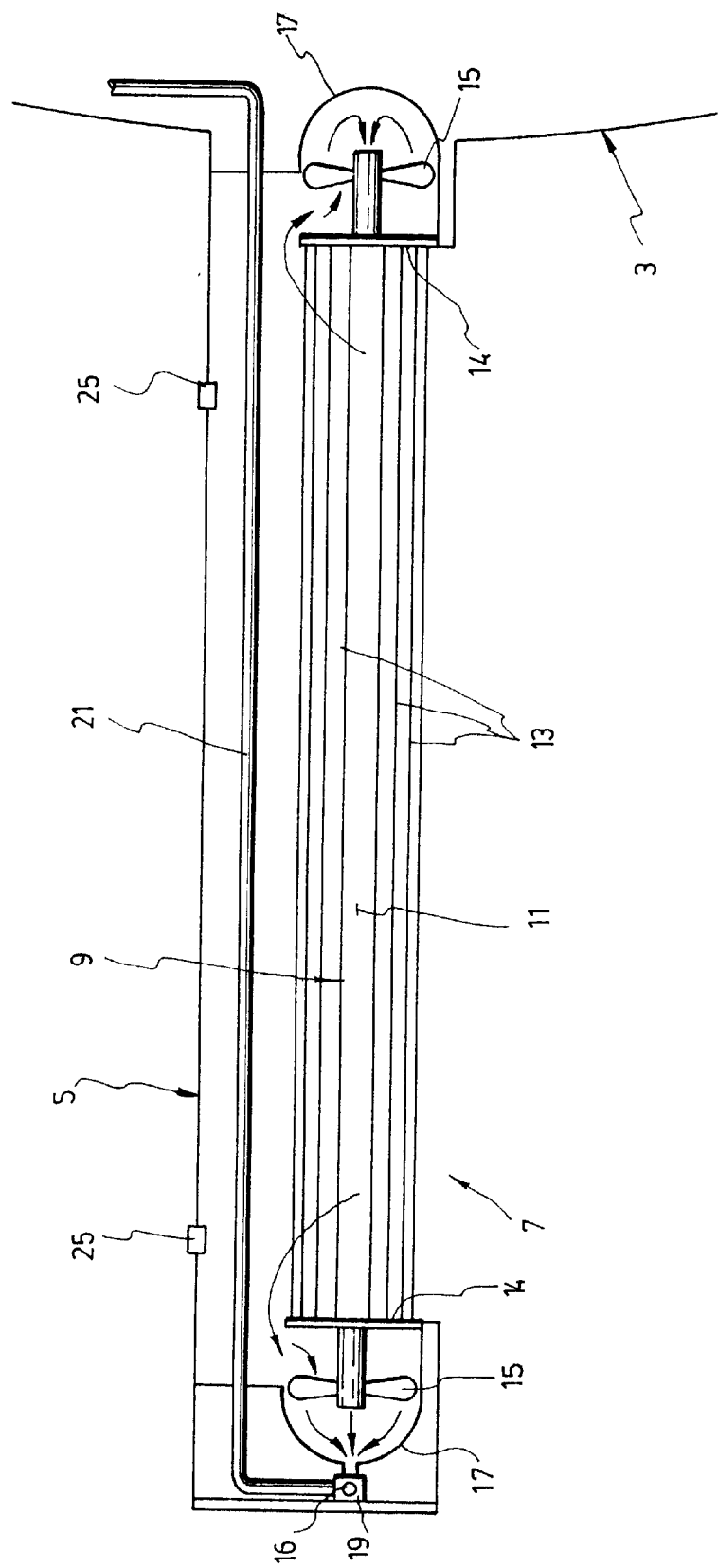
FIG. 2 is a cross-sectional top plan view of one of the horizontal wings of the aircraft shown in FIG. 1.
Figure 3:
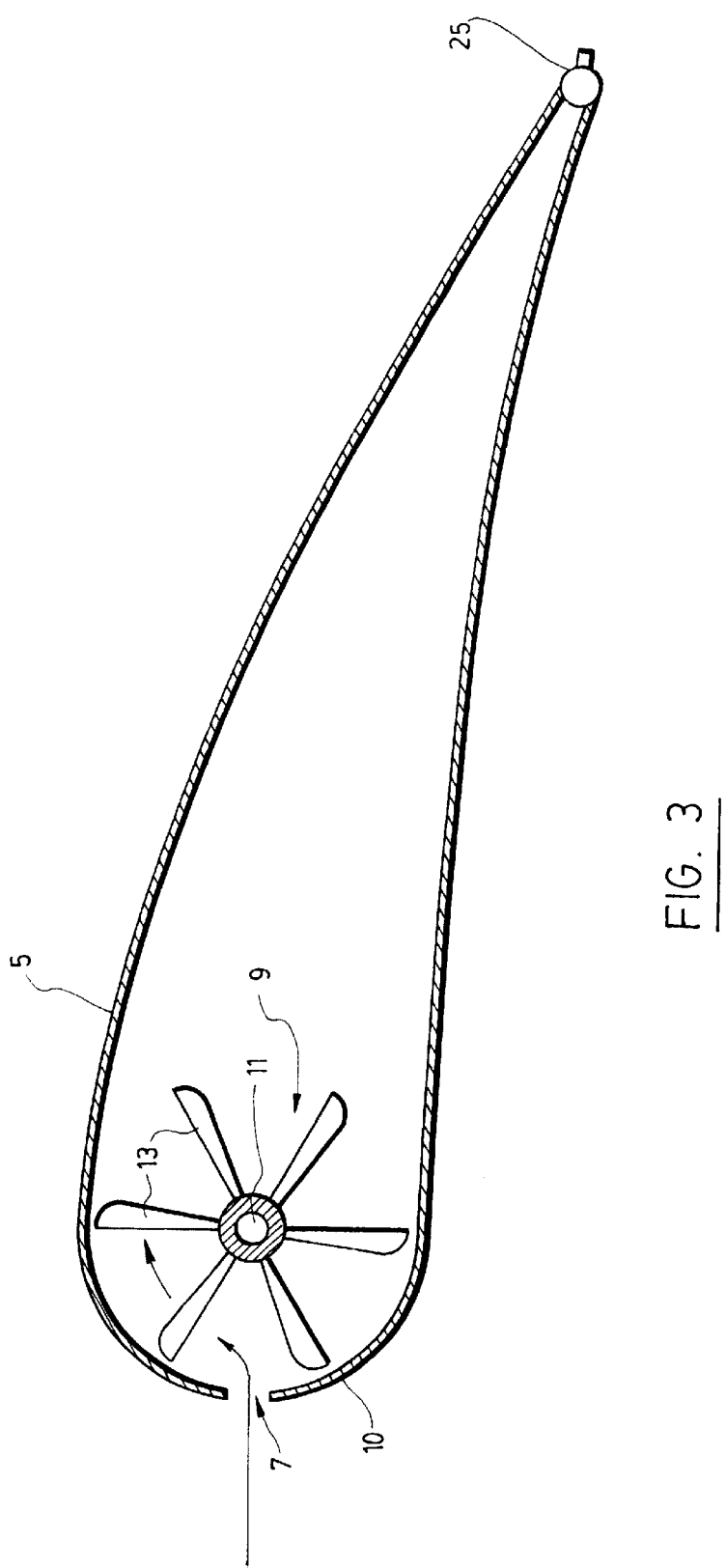
FIG. 3 is a cross-sectional, side elevational view of the horizontal wing shown in FIG. 2.

As is better shown in FIGS. 2 and 3, each horizontal wing 5 is hollow and provided with a front edge with at least one slot 7 allowing a fluid, viz. air, to enter into it. A windmill 9 is mounted behind the slot 7 within the wing 5.

The windmill 9 comprises a shaft in the form of a hollow cylinder 11 i.e. a pipe, extending parallel to the wing edge and a set of foils 13 projecting from the hollow cylinder 11. The foils 13 are fixed to rings 14 attached to the ends of the cylinder and are oriented radially from the cylinder.

The cylinder 11 rotates clockwise, as seen from the fuselage, on connectors attached to the wing 5 or to the wing 5 and fuselage 3. When they move upon action of the fluid entering through the slot, the foils 13 of the wind mill 9 generates a Bernouilli effect, viz. a lift, while they rotate from near the front of the fixed wing edge to 180° from the slot. At 90° from the slot, the foils are driven by fluid pressure. At 270° from the slot, the fluid is blocked by the front 10 of the wing 5 below the slot 7 (see the side view shown in FIG. 3). Of course, the foils 13 rotate together with the cylinder 11.

It is worth noting also that while the fluid from the wing goes over the windmill, it also generates a Magnus lift.

To both ends of the cylinder 11, propellers 15 are attached. These propellers extend in planes perpendicular to the cylinder 11 and they are driven by the cylinder when the same is rotated by the foils. At short distance from each propeller, a solid fluid blocker that can be part of the ring 14, is connected to the hollow cylinder.

Adjacent to the end of the cylinder 11 that is adjacent to the fuselage 3, a funnel-shaped container 17 is located. The purpose of this container is to force the fluid "catched" by the adjacent propeller into the hollow cylinder (see FIG. 4).

At the other end of the cylinder 11, close to the wing top, a funnel shaped pipe is provided to send the fluid catched by the propellers to nozzles 16 capable of generating up and down jets whose purpose is to give counter-torque of a number of vertical wings. Of course, the fluid "catched" by the propeller adjacent the fuselage 3 is supplied to the nozzles 16 via the hollow cylinder 11. If the up and down jets are not required, the fluid is fed into a pipe 21 extending from the wing tip back to the engine, for use to cool the engine with the fluid and then through a back jet 23 (see FIG. 1) to improve propulsion of the vehicle if it is stable. Overflow valves 25 may also be provided near the fuselage 3 and at the back of the wing to give back jet action whenever necessary.

A tilt-activated control valve 19 is used to control the fluid supply to the nozzles. This valve 19 measures the clockwise and counter clockwise motion of the horizontal wings 5 and stabilizes this motion by producing counter-torques. If the nozzles 16 producing the up and down jets are not in use, the fluid may, as aforesaid, be directed to the rear of the aircraft at 23 to form a back jet and/or used to cool the aircraft engine. It is worth noting that this control system may also be electronic.

What is claimed is:

1. In a fluid vehicle of the type comprising at least one vertical wing in contact with the fluid for generating a forward motion, at least one horizontal wing and a stabilizing torque system for generating jets up and down to opposite ends of said at least one horizontal wing for the purpose of counterbalancing any capsizing effect, the improvement wherein:

said at least one horizontal wing is hollow and comprises a front wedge with at least one slot allowing fluid to enter into it; and said stabilizing torque system comprises:

a windmill mounted within said at least one wing behind the slot, said windmill comprising a rotatable shaft in the form of a hollow cylinder extending parallel to the front edge of said at least one wing and a set of foils radially projecting from the hollow cylinder, said foils being oriented in such a manner as to generate a lift effect when fluid enters into said at least one wing through the slot;

a propeller attached to at least one end of the hollow cylinder so as to be rotated by the same, said propeller being devised and positioned to pump the fluid entering within said at least one wing and to force said fluid either directly or via the hollow cylinder to nozzles provided on at least one of the opposite ends of said at least one wing so as to generate said up and down jets; and a tilt-activated control valve to measure clockwise and counterclockwise motion of said at least one wing and to stabilize said motion by supplying the forced fluid to the nozzle(s) and thus producing the requested countertorque.

2. The improved fluid vehicle of claim 1, wherein said fluid is air or water.

3. The improved fluid vehicle of claim 1, wherein said tilt activated control valve is devised to direct the fluid to the rear of the vehicle in order to form a back jet when no stabilization is required.

4. The improved fluid vehicle of claim 3, wherein said fluid is air and said vehicle is an aircraft.

* * * * *